United States Patent [19]

Nakabayashi et al.

[11] Patent Number: 4,952,323
[45] Date of Patent: Aug. 28, 1990

[54] B2 MICROGLOBULIN ADSORBENT

[75] Inventors: Nobuo Nakabayashi, Chiba; Shozo Koshikawa; Tetsuro Ogawa, both of Tokyo, all of Japan

[73] Assignee: Asahi Kogaku Kogyo Kabushiki Kaisha, Tokyo, Japan

[21] Appl. No.: 253,923

[22] Filed: Oct. 7, 1988

Related U.S. Application Data

[62] Division of Ser. No. 70,467, Jul. 7, 1987, abandoned.

[30] Foreign Application Priority Data

Jul. 7, 1986 [JP] Japan ................................ 61-158072

[51] Int. Cl.$^5$ ............................................ B01D 15/04
[52] U.S. Cl. .................................... 210/691; 423/308; 423/311
[58] Field of Search ................ 210/691; 423/308, 309, 423/311

[56] References Cited

U.S. PATENT DOCUMENTS

| 4,411,794 | 10/1983 | Schwinn et al. | 210/691 |
| 4,421,684 | 12/1983 | Nakashima et al. | 210/691 |
| 4,497,075 | 2/1985 | Niwa et al. | 423/311 |
| 4,650,589 | 3/1987 | Piot et al. | 210/691 |
| 4,728,432 | 3/1988 | Sugiyama et al. | 210/691 |

OTHER PUBLICATIONS

Chemical Abstracts, vol. 68, 1968, p. 7380, Abstract No. 76569s, Columbus, Ohio, US; D. Roelcke.
Patent Abstracts of Japan, vol. 10, No. 53, Mar. 4, 1986; & JPA-A-60 198 458 (Kouken K.K.) 07-10-1985.
Chemical Abstracts, vol. 72, 1970, p. 71, Abstract No. 118300n, Columbus, Ohio, US: T. Kawasaki et al.

Primary Examiner—John Doll
Assistant Examiner—Wayne A. Langel
Attorney, Agent, or Firm—Sughrue, Mion, Zinn, MacPeak & Seas

[57] ABSTRACT

A $\beta_2$ microglobulin adsorbent composed of hydroxyapatite particles having an average size of 5 to 2,000 μm is disclosed. The adsorbent preferably has a Ca/P ratio of 1.5 to 1.8.

8 Claims, 1 Drawing Sheet

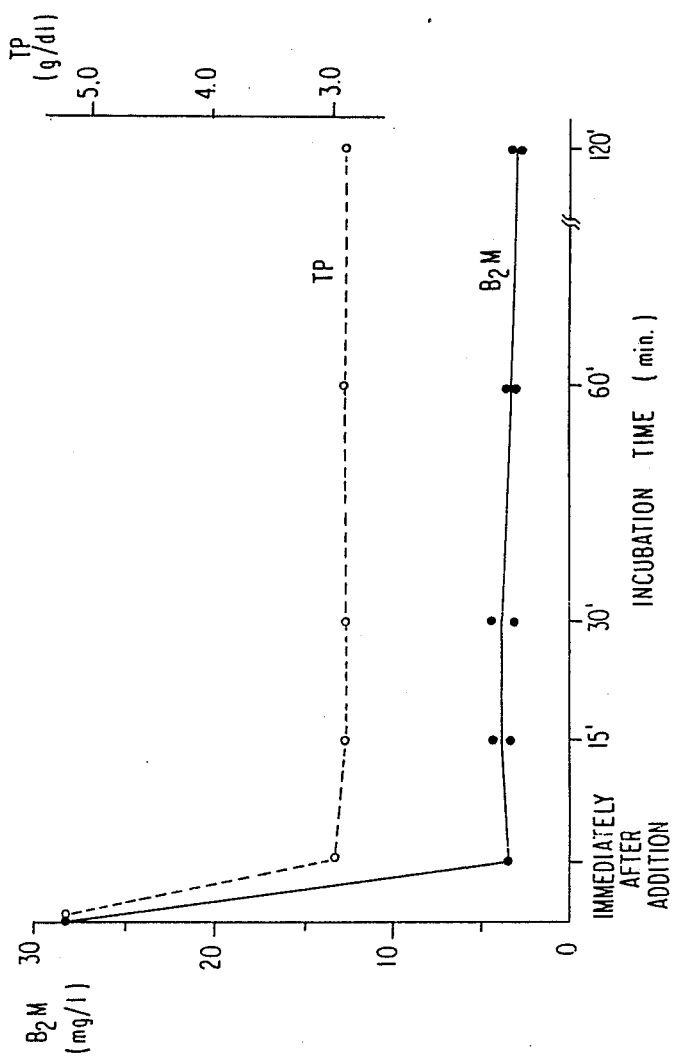

B2 MICROGLOBULIN ADSORBENT

This is a division of application Ser. No. 07/070,467, filed 7/7/87, now abandoned.

FIELD OF THE INVENTION

The present invention relates to an adsorbent or material that is capable of efficient adsorption of $\beta_2$ microglobulins in blood.

BACKGROUND OF THE INVENTION

It has been known that proteins whose molecular weights are too low to be rejected by conventional techniques of blood dialysis occur in blood of patients with renal insufficiency who are receiving dialysis treatment. Among these proteins are $\beta_2$ microglobulins (hereinafter abbreviated as $\beta_2$MG) which is one of the causatives of amyloidosis that frequently occurs in subjects receiving dialysis over a prolonged period and removal of this substance is important for successful treatment of renal insufficiency.

Heretofore, various techniques of blood purification have been employed as the principal means of treating patients with renal insufficiency and they include hemodialysis, blood filtration, blood filtration/dialysis, protein permeating filtration/dialysis, sustained extraneous peritoneum dialysis, blood adsorption therapy with activated carbon, and plasma exchange. However, the clearance or reject ratio of $\beta_2$MG that can be attained by each of these methods is less than 50% and no significant drop of blood $\beta_2$MG levels can be expected.

Therefore, it is strongly desired in clinical fields to develop a higher-performance $\beta_2$MG adsorbent and establish an efficient method of blood purification by using such an adsorbent in blood adsorption therapy which is one of the techniques of blood purification.

SUMMARY OF THE INVENTION

An object of the present invention is to provide an adsorbent that can be used in blood adsorption therapy for the purpose of efficient removal of $\beta_2$MG and other deleterious components from blood.

In order to attain this object, the present inventors conducted intensive studies in which they compared the ability of various substances to adsorb $\beta_2$MG and as a result, they found that hydroxyapatite had a particularly high capability of adsorbing $\beta_2$MG. The present invention has been accomplished on the basis of this finding.

The $\beta_2$MG adsorbent of the present invention is characterized in that it is composed of hydroxyapatite particles having an average size of 5 to 2,000 $\mu$m.

BRIEF DESCRIPTION OF THE DRAWING

The accompanying drawing is a graph showing the relationship between the incubation time of serum containing the adsorbent of the present invention and each of the $\beta_2$MG level and the total protein content of the serum.

The term "TP" represents "total protein" present in blood.

DETAILED DESCRIPTION OF THE INVENTION

The hydroxyapatite particles of which the adsorbent of the present invention is made can be synthesized by any of the known methods such as the wet process in which a water-soluble phosphate salt and a water-soluble calcium salt are reacted in an aqueous solution and the dry process in which a phosphoric acid compound is reacted with a calcium compound at high temperatures. Whichever method of synthesis is employed, it is preferable to blend the starting materials in such proportions that the Ca/P ratio of the hydroxyapatite to be finally obtained will be in the range of 1.5 to 1.8. If the Ca/P ratio is less than 1.5, great difficulty will be involved in obtaining the desired product since the crystalline structure of apatite cannot be retained. If the Ca/P ratio exceeds 1.8, products other than apatite will also form, which reduces the ability of the finally obtained product to adsorb $\beta_2$MG.

The hydroxyapatite particles produced by either one of the methods described above is subsequently granulated by any common technique such as spray granulation with a spray dryer, disk granulation, and crush granulation.

In the first method, a slurry of hydroxyapatite particles dispersed in water is spray-dried at a temperature of about 100° to 250° C. to form generally spherical granules.

In the second method, the hydroxyapatite particles on a disk plate are allowed to agglomerate into granules by rotating the disk. In the third method, blocks of hydroxyapatite particles are crushed into granules.

The hydroxyapatite granules may assume a variety of shapes such as spherical, flaky, filamentous and amorphous forms, provided that they will have an average size of 5 to 2,000 $\mu$m after firing. If the average size of fired hydroxyapatite granules is less than 5 $\mu$m, an increased pressure loss will occur when blood to be treated is allowed to flow. If the average particle size exceeds 2,000 $\mu$m, the specific surface area of the hydroxyapatite particles is reduced to cause a corresponding decrease in adsorption capacity.

The hydroxyapatite granules are then fired preferably at a temperature between 100° and 1,400° C. so as to attain the $\beta_2$MG adsorbent of the present invention. If the firing temperature is less than 100° C., the strength of the fired granules is weak enough to increase the chance of their crumbling into fine particles. If the firing temperature exceeds 1,400° C., the hydroxyapatite will undergo decomposition and its adsorption capacity is decreased. The structure of the hydroxyapatite particles may be porous or solid. In practice, the $\beta_2$MG adsorbent of the present invention is packed in a column through which blood to be treated is passed. By this procedure, $\beta_2$MG and other deleterious components in the blood are adsorbed on the column to produce a purified effluent.

The following examples are provided for the purpose of further illustrating the present invention but are in no sense to be taken as limiting.

EXAMPLE 1

A solution of a phosphate salt was reacted with a solution of a calcium salt by a known method and a slurry of hydroxyapatite was formed. This slurry was dried and granulated with a Mobile Minor spray dryer (product of Ashizawaniro) under the following conditions: hot air temperature, 200° C; feed rate, 2.5 l/hr; rotational speed of spray disk, 25,000 rpm. The granulation was fired to produce hydroxyapatite particles having an average diameter of 20.$\mu$m.

These hydroxyapatite particles and four comparative adsorbents, namely cellulosic adsorbent, PAN (polyacrylonitrile) adsorbent of Mitsubishi Rayon Company Limited, immuno-adsorbent IMP (crosslinked polyvinyl alcohol gel), and a sheet of activated carbon (product of Toyobo Co., Ltd.), were used in adsorption of $\beta_2$MG in the sera of patients under dialysis using the following procedures.

One gram each of the test adsorbents was distributed among test tubes, washed with distilled water, and centrifuged at 3,000 rpm for 15 minutes, followed by discarding the supernatant. Six ml of serum was added to each sample which was shaken several times and left to stand for 60 minutes. Measurement of $\beta_2$MG was conducted by the double antibody technique with a $\beta_2$MG radioimmunoassay kit of Eiken Chemical Co., Ltd. The results are shown in Table 1.

TABLE 1

| Adsorbent | $\beta_2$MG (mg/l) |
| --- | --- |
| Hydroxyapatite | 3.5 |
| Cellulosic adsorbent | 26.3 |
| PAN adsorbent | 22.7 |
| Immunoadsorbent | 21.1 |
| Sheet of activated carbon | 21.6 |
| Control | 22.6 |

As the above data shows, the hydroxyapatite particles had a much higher ability to adsorb $\beta_2$MG than the comparative adsorbents which could adsorb little or no $\beta_2$MG.

EXAMPLE 2

Hydroxyapatite (20μm) particles were prepared as in Example 1, and one-gram portions thereof were put into 9 test tubes, washed with distilled water and centrifuged at 3,000 rpm for 15 minutes, followed by discarding of the supernatant.

A 6-ml portion of serum was put into each of the test tubes. One of these test tubes was shaken several times after addition of serum and immediately subjected to compositional analysis (Sample No. 1). The other tubes were grouped in twos and given 30 shakes per minute at room temperature for 15 minutes (Sample Nos. 2-a and 2-b), 30 minutes (Sample Nos. 3-a and 3-b), 60 minutes (Sample Nos. 4-a and 4-b) and 120 minutes (Sample Nos. 5-a and 5-b). Thereafter, these 8 samples were subjected to compositional analysis.

The compositional analysis was conducted on the supernatant that had been separated from each sample by centrifugation at 3,000 rpm for 10 minutes, and the total protein (TP), alubumin (Alb), total bilirubin (T. bil), direct reacting bilirubin (d), indirect reacting bilirubin (i), and $\beta_2$MG present in the supernatant were determined. The results of these measurement are summarized in Table 2, and the relationship between sample shaking time and each of the TP and $\beta_2$MG levels is shown in the accompanying drawing.

Table 2 and the drawing show that the adsorption of $\beta_2$MG is largely independent of the shaking time, with momentary adsorption occurring simply as a result of imparting several shakes. Therefore, the adsorbent of the present invention is highly adapted for continuous blood treatment by such techniques as passage through a column packed with the adsorbent.

TABLE 2

| Sample No. | Shaking Time | TP (g/dl) | Alb (g/dl) | Tibil (mg/dl) | d/i | $\beta_2$MG (mg/l) |
| --- | --- | --- | --- | --- | --- | --- |
| Control |  | 5.2 | 3.4 | 19.7 | 9.0/10.7 | 28.6 |
| 1 | 0 | 3.0 | 1.9 | 8.2 | 5.1/3.1 | 3.4 |
| 2-a | 15 | 2.9 | 1.9 | 6.9 | 4.2/2.7 | 4.3 |
| 2-b | 15 | 2.9 | 1.9 | 7.2 | 4.6/2.6 | 3.3 |
| 3-a | 30 | 2.9 | 1.9 | 7.6 | 4.9/2.7 | 4.3 |
| 3-b | 30 | 2.9 | 2.0 | 7.5 | 4.7/2.8 | 3.1 |
| 4-a | 60 | 2.9 | 1.9 | 7.6 | 4.8/2.8 | 3.5 |
| 4-b | 60 | 2.9 | 1.9 | 7.4 | 4.7/2.7 | 3.2 |
| 5-a | 120 | 2.9 | 2.0 | 7.3 | 4.7/2.6 | 2.9 |
| 5-b | 120 | 2.9 | 1.9 | 7.1 | 4.6/2.5 | 3.2 |

As described in the foregoing, the adsorbent of the present invention which is composed of hydroxyapatite particles with an average size of 5 to 2,000. μm is highly effective in absorbing $\beta_2$MG in blood so as to produce a purified effluent. The adsorbent can, therefore, be used to eliminate $\beta_2$MG from the blood of patients under dialysis treatment so as to prevent the occurrence of amyloidosis and other $\beta_2$MG-related disorders of protein metabolism.

While the invention has been described in detail and with reference to specific embodiments thereof, it will be apparent to one skilled in the art that various changes and modifications can be made therein without departing from the spirit and scope thereof.

What is claimed is:

1. A process for adsorbing $\beta_2$ microglobulins comprising contacting whole blood or blood sera containing $\beta_2$ microglobulins with a $\beta_2$ microglobulin adsorbent composed of hydroxyapatite particles having an average size of 5 to 2,000 μm.

2. The process according to claim 1, wherein said hydroxyapatite particles have a Ca/P ratio of 1.5 to 1.8.

3. The process according to claim 1, wherein said hydroxyapatite particles are spherical, flaky, filamentous or amorphous in shape.

4. The process according to claim 2, wherein said hydroxyapatite particles are spherical, flaky, filamentous or amorphous in shape.

5. The process according to claim 3, wherein said hydroxyapatite particles are porous in surface structure.

6. The process according to claim 4, wherein said hydroxyapatite particles are porous in surface structure.

7. The process according to claim 3, wherein said hydroxyapatite particles are non-porous in surface structure.

8. The process according to claim 4, wherein said hydroxyapatite particles are non-porous in surface structure.

* * * * *